United States Patent
Dupuis et al.

(10) Patent No.: US 10,812,206 B2
(45) Date of Patent: Oct. 20, 2020

(54) METHOD AND APPARATUS FOR PREDICTING THE BITRATE OF A REPAIRED COMMUNICATION CHANNEL

(71) Applicant: Nokia Solutions and Networks Oy, Espoo (FI)

(72) Inventors: Nicolas Dupuis, Chaudfontaine (BE); Philippe Dierickx, Saint-Géry (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/734,645

(22) Filed: Jan. 6, 2020

(65) Prior Publication Data

US 2020/0252146 A1 Aug. 6, 2020

(30) Foreign Application Priority Data

Jan. 31, 2019 (EP) .................................... 19154688

(51) Int. Cl.
  *H04B 17/30* (2015.01)
  *H04B 17/373* (2015.01)
  *G06N 20/00* (2019.01)
  *H04B 3/46* (2015.01)

(52) U.S. Cl.
  CPC ........... *H04B 17/373* (2015.01); *G06N 20/00* (2019.01); *H04B 3/46* (2013.01)

(58) Field of Classification Search
  CPC ......... H04B 17/373; H04B 3/46; G06N 20/00
  See application file for complete search history.

(56) References Cited

U.S. PATENT DOCUMENTS

| | | | |
|---|---|---|---|
| 7,042,983 B2 | 5/2006 | Bauer et al. | |
| 8,761,308 B2 * | 6/2014 | Kalyani | H04L 25/0216 375/316 |
| 2006/0098725 A1 | 5/2006 | Rhee et al. | |

(Continued)

FOREIGN PATENT DOCUMENTS

| | | |
|---|---|---|
| EP | 2675074 A1 | 12/2013 |
| EP | 2712096 A1 | 3/2014 |

(Continued)

OTHER PUBLICATIONS

Extended European Search Report received for corresponding European Patent Application No. 19154688.6, dated May 2, 2019, 9 pages.

(Continued)

*Primary Examiner* — Curtis B Odom
(74) *Attorney, Agent, or Firm* — Harness, Dickey & Pierce, P.L.C.

(57) ABSTRACT

Embodiments relate to a method and an apparatus for predicting the bitrate of a repaired communication channel. The method may include, generating a dataset specifying, for a plurality of communication channels, a channel frequency response of a communication channel affected by an impairment, and a channel frequency response of the communication channel non-affected by the impairment, training, based on the dataset, a machine learning model configured to predict a channel frequency response of the repaired communication channel based on the channel frequency response of the communication channel affected by an impairment.

15 Claims, 2 Drawing Sheets

(56) References Cited

U.S. PATENT DOCUMENTS

2007/0092012 A1    4/2007  Wilhelmsson et al.
2008/0205501 A1    8/2008  Cioffi et al.

FOREIGN PATENT DOCUMENTS

| EP | 3528432 A1 | 8/2019 |
| EP | 3562047 A1 | 10/2019 |
| WO | 2018/033890 A1 | 2/2018 |

OTHER PUBLICATIONS

Huo et al., "Cable Health Monitoring in Distribution Networks using Power Line Communications", IEEE International Conference on Communications, Control, and Computing Technologies for Smart Grids (SmartGridComm), Oct. 29-31, 2018, 6 pages.

* cited by examiner

METHOD AND APPARATUS FOR PREDICTING THE BITRATE OF A REPAIRED COMMUNICATION CHANNEL

FIELD OF THE INVENTION

Embodiments of the present invention relates to the field of telecommunication. In particular, embodiments of the present invention relate to a method and an apparatus for predicting the bitrate of a repaired communication channel.

BACKGROUND

The channel frequency response of a communication channel represents the attenuation of the medium on the emitted signal for respective frequencies. In a multi-tones communication system such as DSL, it may be used to fill an appropriate number of bits over the different frequency carriers.

When a communication channel is affected by an impairment, the channel frequency response and the attainable bitrate are impacted. Repairing the communication channel by removing the impairment may improve the channel frequency response and the attainable bitrate. However, the improved bitrate of a repaired communication channel may vary from one channel to the other, so that the cost/benefit ratio of respective repair actions differ. It is therefore desirable to predict, for an impaired communication channel for which reparation may be planned, the channel frequency response and/or the attainable bitrate of the repaired communication channel. Known prediction methods rely for example on curve fitting techniques, interpolation . . . .

SUMMARY

It is thus an object of embodiments of the present invention to propose a method and an apparatus for predicting the channel frequency response of a communication channel, which do not show the inherent shortcomings of the prior art.

Accordingly, embodiments relate to an apparatus comprising means configured for:
generating a dataset specifying, for a plurality of communication channels:
a channel frequency response of a communication channel affected by an impairment, and
a channel frequency response of the communication channel non-affected by said impairment,
training, based on the dataset, a machine learning model configured for predicting, based on the channel frequency response of an impaired communication channel, the channel frequency response of the repaired communication channel.

In some embodiments, generating said dataset comprises determining at least one of the channel frequency response of a communication channel affected by an impairment and the channel frequency response of the corresponding communication channel non-affected by said impairment based on circuit simulation.

In some embodiments, in the dataset, the channel frequency response of a communication channel non-affected by an impairment is specified based on a parameter representative of a relationship between channel attenuation on a logarithm scale and square root of frequency.

In some embodiments, training said machine learning model comprises determining an error representative of:

a comparison between predicted channel frequency responses and expected channel frequency responses, and
a comparison between predicted values of said parameter and admissible values for said parameter.

In some embodiments, training said machine learning model comprises determining an error representative of:
a comparison between predicted channel frequency responses and expected channel frequency responses, and
crossing between predicted channel frequency responses and expected channel frequency responses.

In some embodiments, the machine learning model comprises a convolutional neural network including at least two convolutional layers.

In some embodiments, said means are further configured for generating the dataset based on modem measurement effects typically observed in measured curves. In some embodiments, said means are further configured for determining, based on a channel frequency response measured on an impaired communication channel, a channel frequency response for a corresponding repaired communication channel, based on using the trained machine learning model.

In some embodiments, said means are further configured for determining, based on the channel frequency response for the corresponding repaired communication channel, a bitrate or bitrate improvement for the repaired communication channel.

In some embodiments, said means are further configured for deploying the trained machine learning model in another apparatus.

In some embodiments, said means include at least one processor and at least one memory, the at least one memory storing instructions, the at least one memory and the instructions being configured to, with the at least one processor, cause the apparatus to at least in part perform the functions discussed above.

Embodiments also relate to a computer implemented method comprising:
generating a dataset specifying, for a plurality of communication channels:
a channel frequency response of a communication channel affected by an impairment, and
a channel frequency response of the communication channel non-affected by said impairment,
training, based on the dataset, a machine learning model configured for predicting, based on the channel frequency response of an impaired communication channel, the channel frequency response of the repaired communication channel.

In some embodiments, the method comprises deploying the trained machine learning model in another apparatus.

Embodiments also relates to an apparatus obtained by the above method, comprising means configured for determining, based on a channel frequency response measured on an impaired communication channel, a channel frequency response for a corresponding repaired communication channel, based on using the trained machine learning model.

Embodiments also relate to a computer program comprising instructions for performing the method mentioned before when said instructions are executed by a computer. The computer program may be stored on a computer readable medium. The computer readable medium may be a non-transitory computer readable medium.

BRIEF DESCRIPTION OF THE DRAWINGS

The above and other objects and features of the invention will become more apparent and the invention itself will be best understood by referring to the following description of embodiments taken in conjunction with the accompanying drawings wherein.

DESCRIPTION OF EMBODIMENTS

Figure 1:
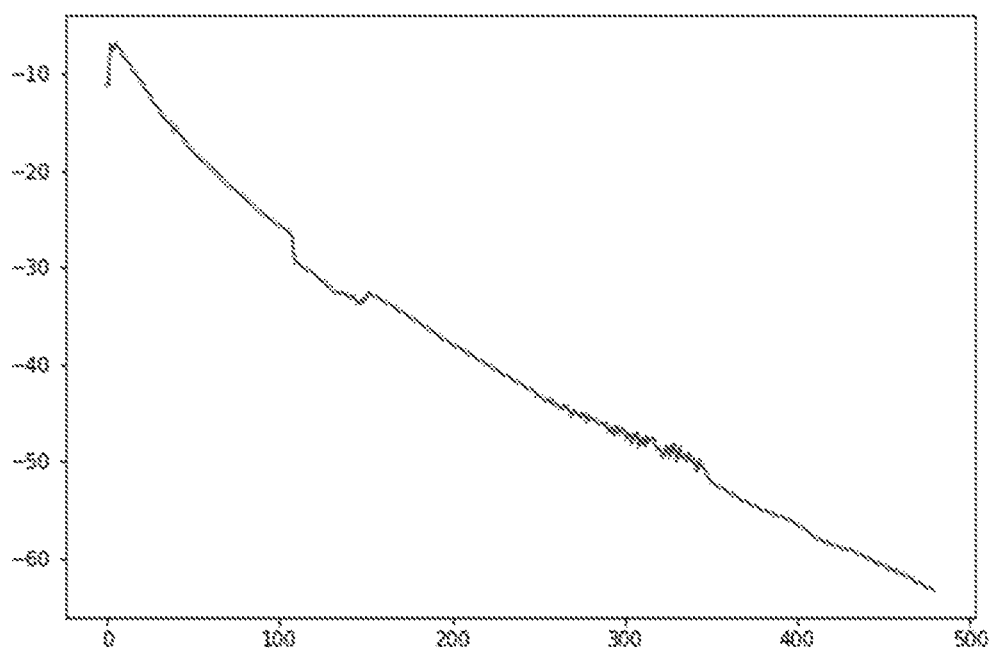
FIGS. 1 and 2 are graphs of channel frequency responses.

FIG. 1 is a graph of a channel frequency response of a communication channel. More specifically, the example of FIG. 1 relates to a Digital Subscriber Line (DSL). The curve is commonly expressed in dB and called H log in the DSL context, and depends on many topological factors, such as the loop length, the wire gauge (line impedance), the insulation type, the connector properties . . . . The H log curve is also sensitive to the presence of any impairment(s) or, in general, to the presence of any unexpected topological configuration. For instance, in the presence of a "double path", commonly called "bridge tap", such H log presents some dips in its shape.

In general, the presence of such impairment affects the quality of service. This occurs as speed reduction, presence of erroneous service, some connection losses, etc. There is therefore a need for detecting these impairments as well as for recognizing them to act accordingly as well as efficiently (right action at the right location with right tools).

However, operators would like also to quantify and predict what can be the gain, for instance in terms of bandwidth, of removing such impairments as this would help and prioritize on the need for an intervention, as well as to state about the capacity to restore an appropriate level of service. In practice, this quantification problem is addressed by trying to estimate the channel frequency response (H log) of a similar loop topology without the presence of impairments. For instance, in the case of an impaired loop containing a bridge tap, this consists in estimating the channel frequency response and the related link capacity for the loop without bridged tap.

It may be difficult to correctly predict the channel frequency response of a repaired/non-impaired communication line, based on the channel frequency response of an impaired communication line. This is illustrated on FIG. 2, which is a graph of channel frequency responses of a communication channel. More specifically:

The curve 10 represents the channel frequency response of a DSL line affected by a misconnected splitter, The curve 11 represents the channel frequency response of the same DSL line with a correctly connected splitter, The curve 12 represents a prediction of the curve 11 based on the curve 10, obtained by a curve fitting technique, and The curve 13 represents a prediction of the curve 11 based on the curve 10, obtained by an embodiment as described hereafter.

It can be seen that curve 12 is not an accurate prediction, in comparison with curve 13. Consequences of such inaccuracies resides mainly:

In the wrong estimation of the "bitrate impact" of such impairment or, in other words, in the wrong prediction of the "bandwidth gain" once repaired.

In the wrong estimation of the loop length. Indeed, the "repaired" (non-impaired) channel frequency response is a good indicator of the loop length (via its slope in the sqrt(frequency) domain, see later).

Not estimating correctly these two aspects lead to not provide relevant/reliable recommendation insights.

From a proactive network wide perspective, operators are willing to prioritize their field interventions to remove impairments on DSL lines where they can ensure that removing the impairment will significantly improve the line performance. In this context, using a reliable method to estimate the bitrate impact of the impairment and ranking/sorting the results network wide will improve customer strategy on the next best action to improve their network.

From a reactive single DSL line scenario (Helpdesk call), improving the accuracy of the bitrate impact related to an impairment and improving the DSL line loop length estimation will permit the operator to better know what the gain will be if the impairment is removed. And as such, better manage the end-customer related to the expectation of a planned field intervention.

Figure 2:
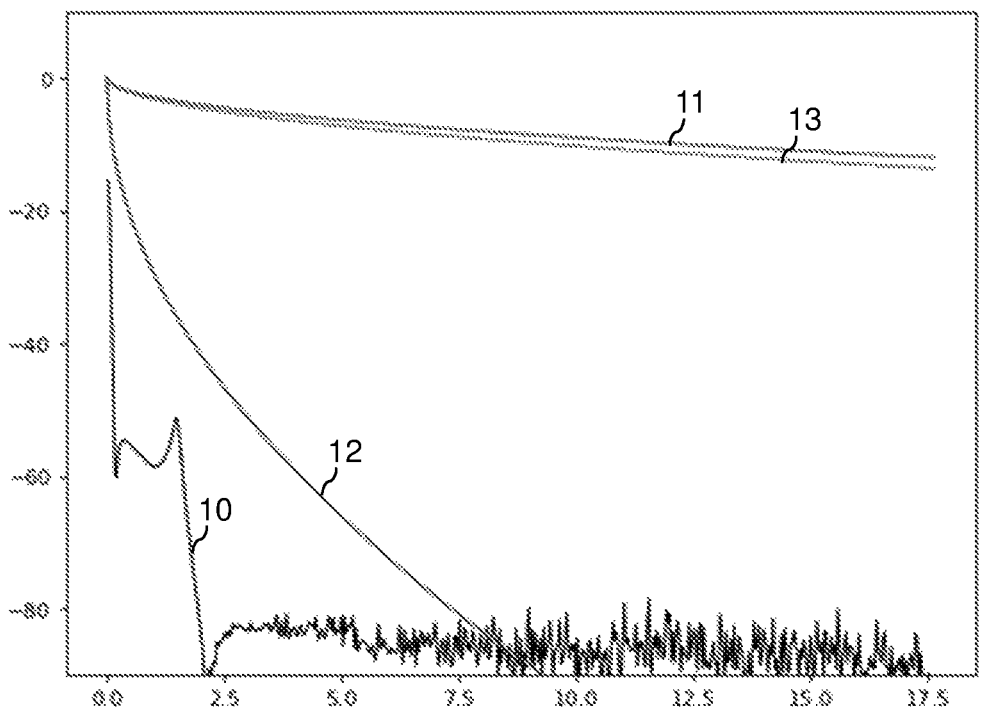

The horizontal axes are different between FIG. 1 and FIG. 2 because in FIG. 1, it's expressed in tones and then to have it in frequency, in case the HLOG is reported for a VDSL2 17 Mhz spectrum, you need to use the carrier group (8) and the tone spacing (4,3125 kHz). Meaning that tone 512 correspond to: 512*CG*Tone_spacing=512*8*4.3125 KHz=17.6 MHz In embodiments of the invention, a communication network comprises network elements connected by one or more communication channel. A communication channel can be a wireline or a wireless channel. The network elements may use appropriate communication protocols to communicate over the communication channels. For example, two network elements may use DSL technology or Power Line Communication technology to communicate over a wireline. Also, two network elements may use cellular communication technology (3GPP 3G, 4G, 5G . . . ) or Wi-Fi technology to communicate over a wireless channel. Further description of embodiments is based on the DSL context. In the DSL context, the channel frequency response is generally called H log, expressed in dB over 512 groups of frequencies.

Figure 3:
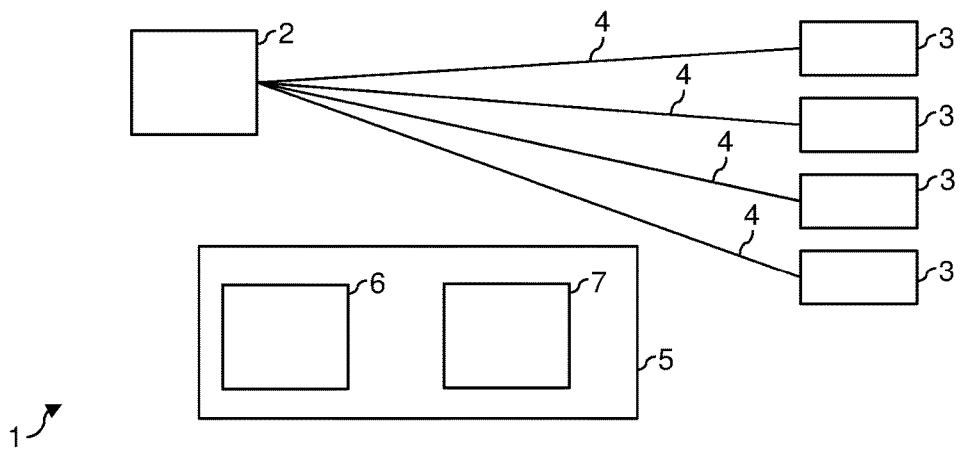
FIG. 3 is a block diagram of communication network.

FIG. 3 is a block diagram of a communication network 1 based on DSL technology. The communication network 1 comprises one or more access nodes 2, one or more terminals 3, one or more communication lines 4 and an apparatus 5.

An access node 2 is for example a DSLAM including a plurality of DSL modems and is connected to one or more terminals 3 by respective communication lines 4.

A terminal 3 is for example a Customer Premise Equipment including a DSL modem. An access node 2 and a terminal 3 use DSL technology for communication over a communication line 4.

A communication line 4 is for example a twisted copper pair.

An access node 2 and/or a terminal 3 may be configured for providing operational data representative of the functioning of the DSL modems and communication line 4. The operational data may specify the channel frequency response of the communication line 4, as measured by the modems of the access node 2 and/or the terminal 3.

The apparatus 5 comprises a monitoring device 6 and a configuration device 7.

The monitoring device 6 may obtain the operational data provided by the access nodes 2 and terminals 3 and perform various monitoring and managing function based on the operational data, such as impairment detection, dynamic line configuration, status visualization and reporting . . . . In particular, as described in more details hereafter, the monitoring device 6 may estimate, based on the channel frequency response of an impaired communication line 4, the channel frequency response and/or the attainable bitrate and/or the available bandwidth of the repaired communication line 4. Note that in the context of this description, the expressions "impaired communication line", "repaired communication line", "non-impaired communication line" may refer to the same line, when the line is respectively in an impaired, repaired or non-impaired state.

The configuration device 7 may generate and provide to the monitoring device 6 a machine learning model configured for estimating, based on the channel frequency response of an impaired communication line 4, the channel frequency response of the corresponding repaired communication line 4.

Note that the distinction between the monitoring device 6 and configuration device 7 is functional. The monitoring device 6 and configuration device 7 may be computer-implemented devices. In some embodiments, the monitoring device 6 and the configuration device 7 correspond to distinct computer or groups of computers. For example, the monitoring device 6 correspond to a server controlled by a network operator and the configuration device 7 correspond to a server controlled by a data analytics company. In other embodiments, the monitoring device 6 and the configuration device 7 may correspond to the same computer or groups of computers, for example to a server controlled by a network operator.

Figure 4:
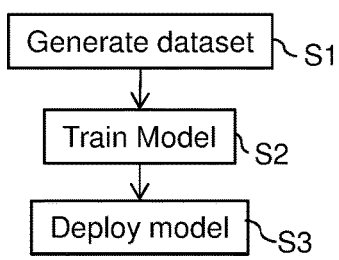
FIG. 4 is a flowchart of a method executed in the communication network of FIG. 3.

FIG. 4 is a flowchart of a method executed by the configuration device 7.

The configuration device 7 generates a training dataset (Step S1). The training dataset specifies, for plurality of communication lines:
a channel frequency response of a communication line affected by an impairment, and
a channel frequency response of the communication line non-affected by the impairment.

For example, various combination of line topologies and impairment types and configurations are considered. The line topology corresponds for example to a length, a wire gauge, an insulator type, a connector type . . . . The impairment type corresponds to one of a bridge tab, a misconnected splitter, an oxidized connection . . . . The impairment configuration corresponds for example to length and position of the bridge tap . . . .

For a given combination of line topology, impairment type and configuration, the configuration device 7 uses circuit simulation techniques to determine the channel frequency responses of the impaired line and of the non-impaired line. Circuit simulation is the task of determining one or more properties of an electrical or electronical circuit based on the model of the circuit. In some embodiments, the configuration device 7 uses two versions of a model of a communication line: one with an impairment and another without the impairment. The respective channel frequency responses are obtained based on simulation. This pair of channel frequency response correspond to a training sample of the training dataset, where the channel frequency response of the non-impaired line may be regarded as the label for supervised training.

In some embodiments, data augmentation techniques are used for increasing the number of training samples obtained based on simulation and covering more real-world situations. For example, a new training sample may be obtained by modifying the channel frequency response of an impaired line obtained based on simulation, based on adding modem measurement effects typically observed in measured curves.

The channel frequency response of an impaired line may be expressed as a vector of N values corresponding to N frequencies or frequency groups. Typically, N=512 in the DSL context. This is a commonly used format and may results from an aggregation of a larger curve, depending on the technologies. For instance, in VDSL2 17 Mhz, a measured H log of 4096 tones is aggregated by a ratio of 1:8, producing a H log curve of 512 tone groups.

In some embodiments, the channel frequency response of a repaired line (non-impaired line) may also be expressed as a vector of N values corresponding to N frequencies of frequency groups. However, based on transmission theory, mainly due to the "skin effect", a healthy DSL copper pair has a channel frequency response expressed in a logarithmic scale (dB) which presents linear attenuation with respect to the square root of the signal frequency. Formally, this is expressed as:

$$H \log[dB]=a*\mathrm{sqrt}(f[Hz])$$

where the parameter a can take any value in the interval [−Inf, 0]. Accordingly, in some embodiments, in the training dataset, the channel frequency response of a non-impaired line is specified by the value of parameter a.

Then, the configuration device 7 trains a machine learning model based on the generated training dataset (step S2).

The machine learning model is configured for determining the channel frequency response of a repaired line based on the channel frequency response of an impaired line. For example, the machine learning model takes as input a vector of size N specifying the channel frequency response of an impaired line, and outputs the value of the parameter a for the corresponding repaired communication line.

Various architecture of machine learning model may be used, and an example is described later in reference to FIG. 5.

Training the machine learning model comprises setting the values of parameters of the models, for example weights and biases, based on the training dataset. This may involve the stochastic gradient descent algorithm or another training algorithm. The training samples may be processed by batches.

The stochastic gradient descent algorithm and other training algorithms are based on determining an error. In some embodiments, training comprises determining an error which depends on at least one of:
a comparison between the predicted channel frequency responses and the expected channel frequency responses,
crossing between predicted channel frequency responses and target channel frequency responses,
in embodiments wherein the channel frequency response is specified by one or more parameters, for example parameter a, admissible values of the parameters.

For example, in some embodiments, the configuration device 7 uses the following error:

$$\mathrm{HYBRID\_MSE}_{[batch]}=\mathrm{mean}_{[batch]}(SE_{slope}+SE_{crossing}+SE_{positive}),$$

with:

$$SE_{slope}=(a_{predicted}-a_{target})^2$$

$$SE_{crossing}=\text{mean}_{tones}((H\log_{predicted}-H\log_{target})^2,\\ \text{only for tones where } H\log_{predicted}>H\log_{target})$$

$$SE_{positive}=(a_{predicted})^2, \text{only if } a>0$$

Using such hybrid errors contributes to predicting channel frequency responses which satisfy domain-knowledge requirements.

Then, at least in embodiments wherein the configuration device 7 and the monitoring device 6 are distinct from each other, the configuration device 7 deploys the trained machine learning model in the monitoring device 6 (step S3). This involves sending data representative of the architecture and/or parameters of the trained machine learning model to the monitoring device 6, thereby directly obtaining a monitoring device 6 configured for using the trained machine learning model.

Figure 5:
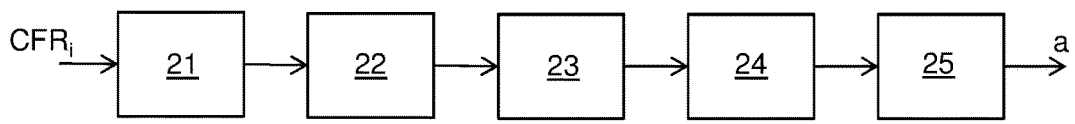
FIG. 5 is a block diagram of a machine learning model configured for predicting, based on the channel frequency response of an impaired communication channel, the channel frequency response of the repaired communication channel.

FIG. 5 is a block diagram of a machine learning model 20, which is used by the apparatus 5 in some embodiments.

The machine learning model 20 is convolutional neural network. The input of the machine learning model 20 is a vector of size N representing the channel frequency response of an impaired line, and the output of the machine learning model 20 is an estimated value of parameter a which specifies the channel frequency response of the corresponding repaired line.

The machine learning model 20 comprises a first convolutional layer 21, a first pooling layer 22, a second convolutional layer 23, a second pooling layer 24 and a regression layer 25, arranged in series.

The first convolutional layer 21 comprises a plurality of filters of size $1 \times D_1$. The second convolutional layer 22 comprises a plurality of filters of size $1 \times D_2$. An impaired H log curve typically presents a repetition of patterns indicative of the impairment type. The combination of two convolutional layers allows detecting the patterns and their repetition. For an input curve with N=512, example sizes are $D_1<=8$ and $D_2>=10$. Another important aspect of convolutional filtering is the number of filters in use. From the machine learning best practice theory, lower is the complexity of a model, higher is its ability to generalize. As there is a direct relationship between the number of filters in use toward the number of features to combine and therefore toward complexity, the lower, the better. However, we would like anyway to extract enough features to be able to perform an accurate prediction. There is a trade-off therefore to make. A preferred design is therefore between 8 and 16 fundamental shapes, but not much. Proposing more than 16 filters, as this is common in computer vision, is not relevant here. By contrast, proposing fewer filters (e.g. <4) will not allow to detect or make the distinction between some of the fundamental shapes, making impossible to detect or separate the different impairments.

The pooling layers 22 and 24 allow reducing the size of the features maps and therefore the complexity of the model. This comes from the fact that, as convolution mitigate neighboring values, there is a redundancy of information between neighboring outputs. There is therefore at this stage opportunity to reduce the model complexity. Knowing that the final output consists only in the prediction of a single scalar value ("a") and knowing that there is an intrinsic smoothing effect, the pooling layers 22 and 24 may perform fairly high pooling (down sampling), usually by a 1:X ratio, where X is usually equal or smaller than the size of the filter. In our case, this means a pooling <1:8 in the first pooling layer 22, and of <1:10 in the second pooling layer 24.

The regression layer 25 is also made of neurons and belong to the same neural network, as visible in FIG. 5. Compared to the convolutional part, the purpose is to establish a relationship between all the features and the coefficient "a" to predict. At that stage, there is therefore no convolutional filtering nor pooling, but only connections between all neurons toward other layer neurons. The regression layer 25 may be a fully-connected part comprising an input layer, a hidden layer and an output layer. The input layer receives the features provided by the convolutional part (convolutional layers 21, 23, pooling layers 22, 24). The output layer comprises a single neuron which outputs the value a.

Beside these aspects, usually the major difference between the neuronal model proposed for feature extraction and for regression resides in the difference between the activation function. Typically, Rectified Linear Unit (ReLU) activation functions are used to perform convolution using neurons (which is a linear process), while non-linear activation functions are preferred for regression purpose. This is the preferred option. However, as the coefficient to predict is continuously and fairly uniformly distributed, this makes no sense to opt for saturating activation functions like SoftSign or Tan H. In that sense, it has been preferred to opt for eLU function for our use-case.

Finally, the main tuning factor in this fully connected stage is the amount of neurons in-use. Between the number of feature and the single scalar output value, a fairly low number of neurons (<128) may been chosen. From a domain expertise, there is no valid reason at this stage to introduce extra complexity in the model by adding extra layers. A single regression layer is therefore chosen and will be finally connected to the output layer consisting in one neuron outputting the coefficient value to predict.

Figure 6:
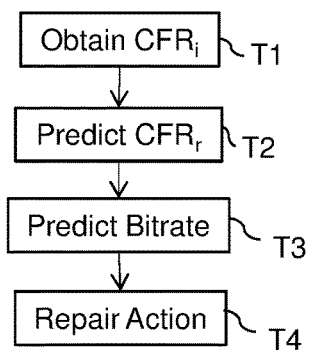
FIG. 6 is a flowchart of a method executed in the communication network of FIG. 3.

FIG. 6 is a flowchart of a method executed by the monitoring device 6.

The monitoring device 6 obtains data specifying of the channel frequency response $CFR_i$ of a communication line 4 (step T1). In some embodiments, the communication line 4 has been already identified as an impaired line, based in particular on analysis of the communication line 4.

The monitoring device 6 determines a channel frequency response $CFR_r$ based on the channel frequency response $CFR_i$ (step T2), by using the trained machine learning model. The channel frequency response $CFR_r$ represents an estimation of the channel frequency response that could be obtained for the communication line 4 after a repair action which aims at removing the impairment.

In some embodiments, the monitoring device 6 determines a bitrate and/or bitrate improvement based on the channel frequency response $CFR_r$ (Step T3). The determined bitrate represents an estimation of the attainable bitrate on the communication line 4, for a given communication technology, that could be obtained for the communication line 4 after a repair action which aims at removing the impairment. The determined bitrate improvement represents the difference between this bitrate and the actual bitrate on the impaired communication line 4. Known techniques allow determining a bitrate based on a channel frequency response, for a given technology such as VDSL2 or G.Fast.

Steps T1 to T3 may be performed for a plurality of communication lines 4. Accordingly, the potential bitrate, bitrate improvement and/or impairment type of a plurality of communication line 4 may be determined. This allows comparing the cost/benefit of a repair action for respective communication lines 4 or groups of communication lines 4.

Accordingly, in some embodiments, the monitoring device 4 determines a recommended repair action for the communication network 1 (Step T4). This may comprise determining and/or outputting (for example displaying) a list of proposed repair actions. The list may be ranked based on one or more of potential bitrate for the repaired line, potential bitrate improvement for the repaired line, a cost/benefit ratio . . . . In some embodiments, the monitoring device 4 commands the execution of one of the proposed repair action.

Comparative tests have shown an improved accuracy for channel frequency response predictions and bitrate predictions, when comparing outputs of the method of FIG. 6 with other prediction solutions, e.g. based on curve fitting techniques. Confidence interval related to the predicted values are also improved (e.g. smaller). This means that the method of FIG. 4 provides an accurate modelling of the relationship between the channel frequency responses of a communication channel, respectively in an impaired state and in a repaired state. The trained machine learning model can be used for bitrate predictions or other predictions and analysis.

The improved bitrate predictions allow an appropriate ranking of repair actions for respective communication channels or groups of communication channels, e.g. based on cost/benefit.

Figure 7:
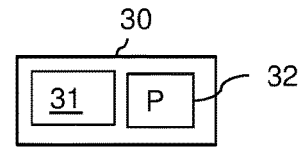
FIG. 7 is a structural view of an apparatus used in the network of FIG. 3.

FIG. 7 is a block diagram representing the structural architecture of an apparatus 30. The apparatus 30 may correspond to one of the apparatus 5, the monitoring device 6 and the configuration device 7.

The apparatus 30 comprises a processor 31 and a memory 32. The memory 32 stores computer program code P. The memory 32 and the computer program code P are configured for, with the processor 31, causing the apparatus 30 to perform, at least in part, the method described with reference to FIG. 4 and/or FIG. 6.

In the context of this description, a machine learning model is a function for outputting an output based on an input, which depends on trainable parameters. An example of machine learning model is a neural network, with weights and biases as parameters. Training the machine learning model is the task of determining the parameters of the model based on training data.

It should be noted that although examples of methods have been described with a specific order of steps, this does not exclude other implementations. In particular, the described steps may be executed in another order, partially or totally in parallel . . . .

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represent various processes which may be substantially represented in computer readable medium and so executed by a computer or processor, whether or not such computer or processor is explicitly shown.

While the principles of the invention have been described above in connection with specific embodiments, it is to be clearly understood that this description is made only by way of example and not as a limitation on the scope of the invention, as defined in the appended claims.

The invention claimed is:

1. An apparatus comprising:
    at least one processor; and
    at least one memory storing instructions, the at least one memory, the instructions, and the at least one processor configured to cause the apparatus to:
    generate a dataset specifying, for a plurality of communication channels,
        a channel frequency response of a communication channel affected by an impairment, and
        a channel frequency response of said communication channel non-affected by said impairment, specified by a parameter representative of a relationship between channel attenuation on a logarithm scale and square root of frequency, and
    train, based on the dataset, a machine learning model configured, to predict a channel frequency response of a repaired communication channel based on the channel frequency response of the communication channel affected by an impairment,
    wherein training said machine learning model comprises determining an error representing,
        a comparison between the predicted channel frequency responses and expected channel frequency responses, and
        a comparison between predicted values of said parameter and admissible values for said parameter.

2. The apparatus according to claim 1, wherein said memory, said instructions, and said processor are further configured to cause the apparatus to:
    generate said dataset by determining at least one of the channel frequency response of the communication channel affected by an impairment or the channel frequency response of the corresponding communication channel non-affected by said impairment based on a circuit simulation.

3. The apparatus according to claim 1, wherein said memory, said instructions, and said processor are further configured to cause the apparatus to:
    train said machine learning model by determining an error representing,
        a comparison between the predicted channel frequency responses and the expected channel frequency responses, and
        crossing between the predicted channel frequency responses and the expected channel frequency responses.

4. The apparatus according claim 1, wherein the machine learning model comprises a convolutional neural network including at least two convolutional layers.

5. The apparatus according to claim 1, wherein said memory, said instructions, and said processor are further configured to cause the apparatus to:
   generate the dataset based on modern measurement effects.

6. The apparatus according to claim 1, wherein said memory said instructions, and said processor are further configured to cause the apparatus to:
   use the trained machine learning model to determine a channel frequency response for a corresponding repaired communication channel, based on the channel frequency response measured on the impaired communication channel.

7. The apparatus according to claim 6, wherein said memory said instructions, and said processor are further configured to cause the apparatus to:
   determine a bitrate or bitrate improvement for the repaired communication channel based on the channel frequency response for the corresponding repaired communication channel.

8. The apparatus according to claim 1, wherein said instructions, said memory, and said processor are further configured to cause the apparatus to:
   deploy the trained machine learning model in another apparatus.

9. A computer implemented method comprising:
   generating a dataset specifying, for a plurality of communication channels,
      a channel frequency response of a communication channel affected by an impairment, and
      a channel frequency response of said communication channel non-affected by said impairment, specified by a parameter representative of a relationship between channel attenuation on a logarithm scale and square root of frequency, and
   training, based on the dataset, a machine learning model configured to predict a channel frequency response of a repaired communication channel based on the channel frequency response of the communication channel affected by an impairment,
   wherein training said machine learning model comprises determining an error representing,
      a comparison between the predicted channel frequency responses and expected channel frequency responses, and
      a comparison between predicted values of said parameter and admissible values for said parameter.

10. The method according to claim 9, comprising,
    deploying the trained machine learning model in an apparatus.

11. The method according to claim 9, wherein the generating said dataset comprises:
    determining at least one of the channel frequency response of the communication channel affected by an impairment or the channel frequency response of the corresponding communication channel non-affected by said impairment based on a circuit simulation.

12. The method according to claim 9, wherein training said machine learning model comprises:
    determining an error representing,
       a comparison between the predicted channel frequency responses and the expected channel frequency responses, and
       crossing between the predicted channel frequency responses and the expected channel frequency responses.

13. The method according to claim 9, comprising:
    generating the dataset based on modern measurement effects.

14. A non-transitory computer-readable medium storing instructions, which when executed by a computer, cause the computer to perform the method of claim 9.

15. An apparatus obtained by the method of claim 10, comprising:
    at least one processor; and
    at least one memory storing instructions, the at least one memory, the instructions, and the at least one processor configured to cause the apparatus to,
       use the trained machine learning model to determine a channel frequency response for a corresponding repaired communication channel, based on the channel frequency response measured on the impaired communication channel.

* * * * *